(12) United States Patent
Allen et al.

(10) Patent No.: US 9,514,124 B2
(45) Date of Patent: Dec. 6, 2016

(54) EXTRACTING AND RECOMMENDING BUSINESS PROCESSES FROM EVIDENCE IN NATURAL LANGUAGE SYSTEMS

(71) Applicant: International Business Machines Corporation, Armonk, NY (US)

(72) Inventors: Corville O. Allen, Morrisville, NC (US); Faheem Altaf, Pflugerville, TX (US); Swaminathan Chandrasekaran, Coppell, TX (US); James D. Wiggins, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/615,071

(22) Filed: Feb. 5, 2015

(65) Prior Publication Data

US 2016/0232155 A1 Aug. 11, 2016

(51) Int. Cl.
*G06F 17/27* (2006.01)
*G06Q 10/06* (2012.01)

(52) U.S. Cl.
CPC ......... *G06F 17/277* (2013.01); *G06F 17/2785* (2013.01); *G06Q 10/06316* (2013.01)

(58) Field of Classification Search
None
See application file for complete search history.

(56) References Cited

U.S. PATENT DOCUMENTS

| | | | |
|---|---|---|---|
| 6,829,603 B1 * | 12/2004 | Chai | G06F 17/30684 |
| 8,301,438 B2 * | 10/2012 | Ferrucci | G06F 17/30654 704/1 |
| 8,738,365 B2 * | 5/2014 | Ferrucci | G06F 17/30507 704/9 |
| 9,324,025 B2 * | 4/2016 | Byron | G06N 5/02 |
| 2005/0080647 A1 | 4/2005 | Okada et al. | |
| 2008/0010259 A1 * | 1/2008 | Feng | G06F 17/3087 |
| 2008/0019496 A1 * | 1/2008 | Taschereau | G06F 17/3087 379/218.01 |

(Continued)

OTHER PUBLICATIONS

High, Robert, "The Era of Cognitive Systems: An Inside Look at IBM Watson and How it Works", IBM Redbooks (2102).

(Continued)

*Primary Examiner* — Satwant Singh
(74) *Attorney, Agent, or Firm* — Diana R. Gerhardt; Jack V. Musgrove

(57) ABSTRACT

A natural language question and answer system analyzes a question to determine key characteristics (such as focus and lexical answer type), and matches those characteristics to business processes from business process repositories. The matching business processes are ranked and at least one is presented as a recommended answer to the user. The system can offer the user a trigger to invoke the particular business process. The analysis includes examining a user profile to determine an attribute relevant to the question, and further includes named entity searching and fuzzy string matching against the business process repositories. Each business process in a repository is designated as either idempotent, non-binding or retrieve-only. The matching can include performing a factorial LDA algorithm on both extracted named entities and latent factors of the business processes in the repositories.

21 Claims, 3 Drawing Sheets

(56) References Cited

U.S. PATENT DOCUMENTS

| | | | | |
|---|---|---|---|---|
| 2012/0303356 A1* | 11/2012 | Boyle | ............... | G06F 17/30672 |
| | | | | 704/9 |
| 2013/0018652 A1 | 1/2013 | Ferrucci et al. | | |
| 2013/0246392 A1* | 9/2013 | Farmaner | .......... | G06F 17/30442 |
| | | | | 707/713 |
| 2013/0290366 A1* | 10/2013 | Boyle | ............... | G06F 17/30672 |
| | | | | 707/767 |
| 2014/0114659 A1* | 4/2014 | Sharifi | .................. | G10L 15/265 |
| | | | | 704/235 |
| 2014/0164304 A1* | 6/2014 | Bagchi | ..................... | G06N 5/02 |
| | | | | 706/46 |
| 2015/0066644 A1* | 3/2015 | Narasimhan | ........... | G06Q 30/02 |
| | | | | 705/14.53 |
| 2015/0170248 A1* | 6/2015 | Chung | ................ | G06F 17/3053 |
| | | | | 705/26.63 |
| 2015/0261836 A1* | 9/2015 | Madhani | ........... | G06F 17/30011 |
| | | | | 707/602 |
| 2015/0347467 A1* | 12/2015 | Basson | ............. | G06F 17/30289 |
| | | | | 707/769 |
| 2016/0170976 A1* | 6/2016 | Byron | ..................... | G06N 5/02 |
| | | | | 706/11 |

OTHER PUBLICATIONS

High, Robert et al., "Transforming the Way Organizations Think with Cognitive Systems", IBM Academy of Technology (2102).

\* cited by examiner

EXTRACTING AND RECOMMENDING BUSINESS PROCESSES FROM EVIDENCE IN NATURAL LANGUAGE SYSTEMS

BACKGROUND OF THE INVENTION

1. Field of the Invention

The present invention generally relates to natural language question and answer systems, and more particularly to an automated method of recommending a specific business process in response to a natural language question.

2. Description of the Related Art

As interactions between users and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and cognitive systems such as the Watson™ cognitive technology marketed by International Business Machines Corp.

Text analysis is known in the art pertaining to NLP and typically uses a text annotator program to search text documents (corpora) and analyze them relative to a defined set of tags. The text annotator can generate linguistic annotations within the document to tag concepts and entities that might be buried in the text. A cognitive system can then use a set of linguistic, statistical and machine-learning techniques to analyze the annotated text, and extract key business information such as person, location, organization, and particular objects (e.g., vehicles), or identify positive and negative sentiment. The Watson system relies on hypothesis generation and evaluation to rapidly parse relevant evidence and evaluate potential responses from disparate data. End users can pose certain questions in a natural language for which the system responds with a procedural answer (with associated evidence and confidence). For example, an end user might ask any of the following natural language questions:
  When does my phone contract end?
  What is the procedure to return my defective device?
  How can I put a temporary suspend on my salary ACH?
  What is the process to file an insurance claim?
  How do I raise an inquiry on my billing statement?
For each of these questions, a natural language question and answer (NLQA) system can be trained to come back with a generalized answer, typically pointing to other sources which can provide procedural responses that tell the end user what to do textually.

SUMMARY OF THE INVENTION

The present invention is generally directed to a method of responding to a natural language question from a user by receiving the natural language question in a computer-readable form, analyzing the natural language question to find a plurality of key characteristics, matching a plurality of business processes from at least one business process repository to the key characteristics, ranking the plurality of matching business processes, by executing fourth instructions in the computer system, and recommending at least one particular business process from the plurality of matching business processes based on said ranking. The question analysis may include named entity searching and fuzzy string matching of one or more of the key characteristics against the business process repository, and may further involve examining a user profile for the user to determine a user attribute that is relevant to the natural language question. The matching may include performing a factorial LDA algorithm on both extracted named entities and latent factors from evidence against the key characteristics. In an illustrative implementation the key characteristics at least include a focus term and a lexical answer type. Each business process in the repository is preferably designated as one of three process types including idempotent, non-binding or retrieve-only. The user can further be offered a trigger to immediately invoke the particular business process.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

While current cognitive systems have come a long way in simplifying user interactions, particularly with natural language processing, there are still several significant shortcomings in the technology. Typical NLQA systems do not provide an answer that can allow the user to immediately and directly effectuate the intention of the question, but rather rely on excerpts from various ingested corpora. The onus is on the user to decide which texts are pertinent, read the relevant procedures, and follow the instructions step-by-step. There is a huge operational efficiency leak occurring from both a self-service scenario and an agent-assisted scenario. It would, therefore, be desirable to devise a more effective method of responding to a user query which actually helped the user to take action to resolve the matter. It would be further advantageous if the method could provide specific processes to be invoked to fulfill the intention of the user.

These objectives are achieved in a natural language processing (NLP) system that matches and recommends the appropriate business processes from one or more business process repositories to invoke as part of evidence. The business process repository could be an on-premise repository and/or a cloud repository, containing meta-data information about all of the business processes, associated services, and other assets along with textual descriptions/annotations about the processes. For example, if the user asks a question like "What is the procedure to return my defective device?" the an NLP system of the present invention can apply a user profile to understand the device the user is asking about and extract other necessary attributes. The question can then be analyzed by leveraging its lexical answer type and focus, and performing named entity searching and fuzzy searching against the business process repositories. After filtering and ranking the pertinent processes, one or more can be proposed as the right answer to the user along with the answer evidence. A trigger can further be offered back to the user to start the right business process (e.g., a "Defective Device Returns & Handling" business process). The trigger can be any object in the user interface, particularly an object in a graphical user interface such as a button.

Figure 1:
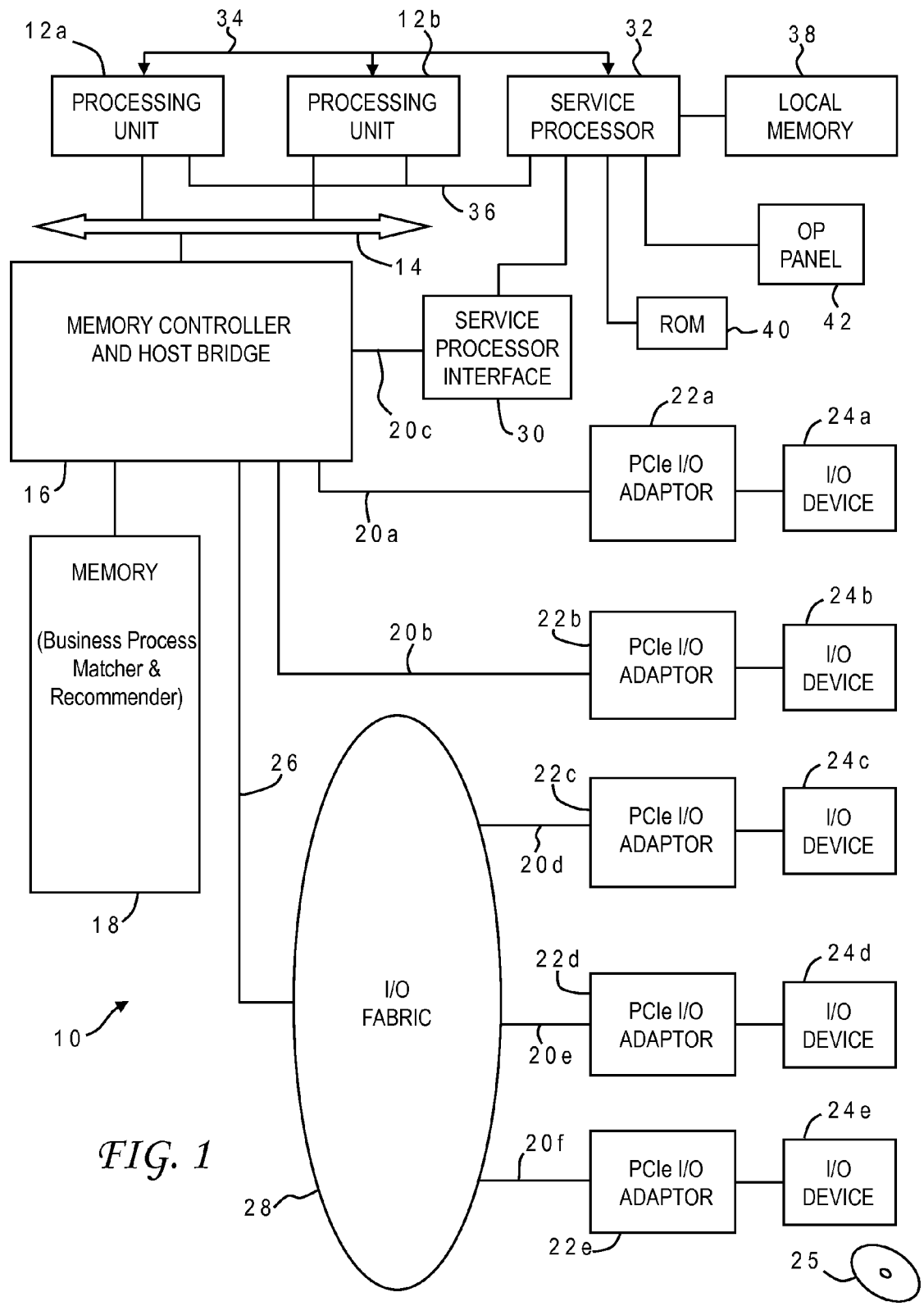
FIG. 1 is a block diagram of a computer system programmed to carry out business process recommendation using natural language processing in accordance with one implementation of the present invention.

With reference now to the figures, and in particular with reference to FIG. 1, there is depicted one embodiment 10 of a computer system in which the present invention may be implemented to carry out the analysis of and response to a natural language question. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. In particular an I/O device can be used to communicate with the business process repositories discussed further below. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the natural language processing application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for an NLP system that uses novel analysis and recommendation techniques to answer user questions. Accordingly, a program embodying the invention may include conventional aspects of various NLP tools, and these details will become apparent to those skilled in the art upon reference to this disclosure.

Figure 2:
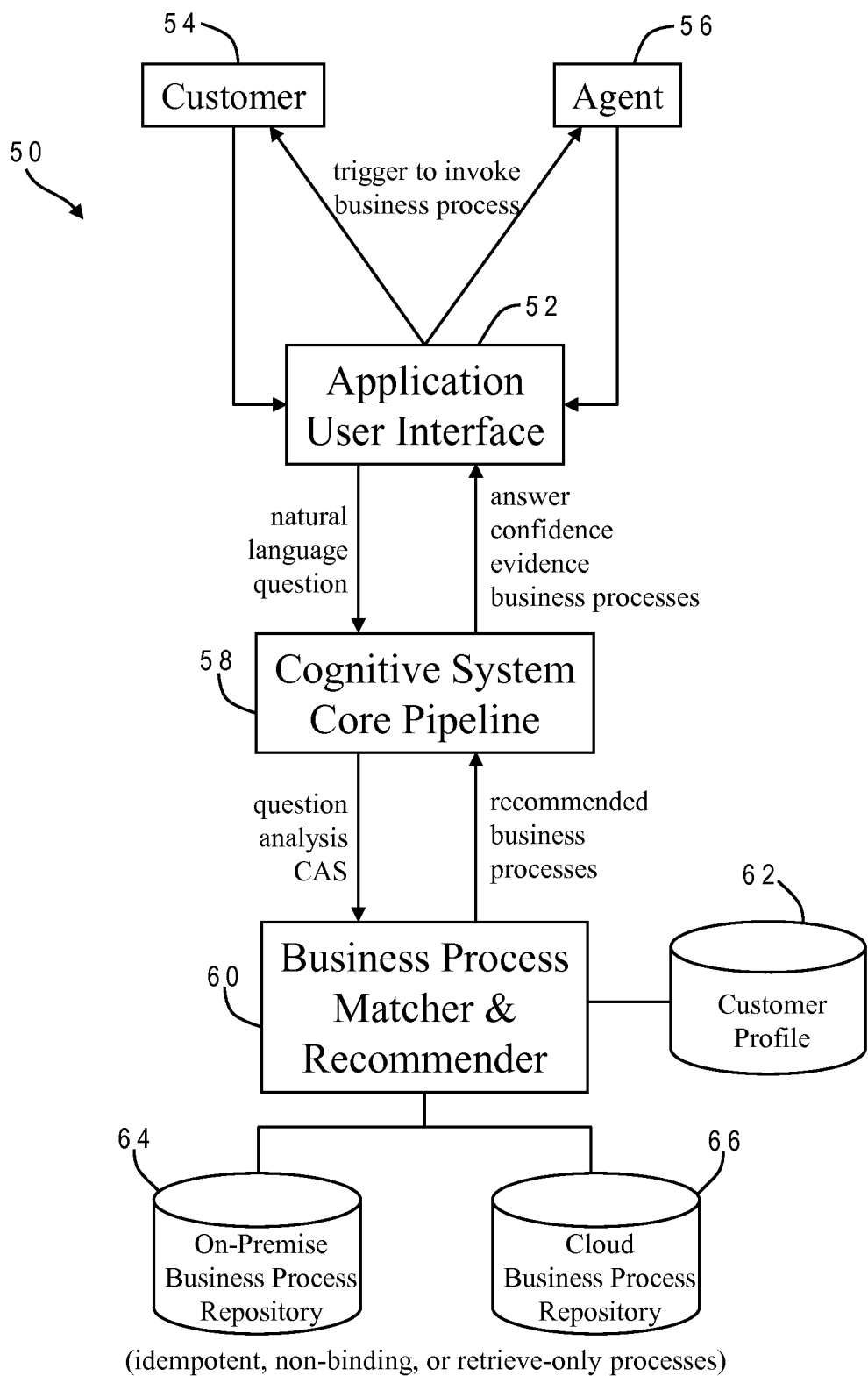
FIG. 2 is a block diagram of one embodiment of a natural language question and answer system which matches selected business processes to a user query in accordance with the present invention.

Referring now to FIG. 2, there is depicted a NLQA system 50 having a user interface 52 which enables a customer (user) 54 or agent 56 to enter natural language queries and receive responses. User interface 52 passes the natural language question to a cognitive system core pipeline 58 which provides front-end natural language processing on the natural language question. In the illustrative implementation the front-end NLP includes identification of a lexical answer type and a focus, and creation of a common analysis structure. Lexical answer type (LAT) and focus are known features of the prior art. A LAT is a term in the question that indicates what type of entity is being asked for, i.e., the primary concept that is being discussed. Focus is essentially the subject of the text or, in the case of a question, the answer to the question or a reference to the answer. The headword of the focus is generally a LAT, but questions often contain additional LATs. For example, in the text passage "It's the Herman Melville novel about a great white whale that is narrated by Ishmael", the text focus is the word "It's" and the lexical answer type is "novel". The common analysis structure (CAS) is also known in the art (a subsystem of the Unstructured Information Management Architecture), and in the preferred implementation is a dynamic data structure that contains unstructured data (i.e., data whose intended meaning is still to be inferred) and structured information inferred from this data, encoded as feature structures. A CAS is basically a unit of work that can be passed from one component to another. Those skilled in the art will appreciate that the present invention may be applied to other analysis techniques besides CAS which can parse a natural language question.

Cognitive system core pipeline 58 preferably includes customized features according to the particular entities or concepts of interest that are relevant to a particular industry. For example, when dealing with business processes in a supply chain, the cognitive system can use customized text annotators to extract concepts like Order Fulfillment, Returns Management, etc. This customization might involve adding new entries to the dictionary that the system uses to be able to extract the concepts.

The question analysis CAS is passed from cognitive system core pipeline 58 to a business process matcher and recommender 60. Business process matcher and recommender 60 can query a customer profile 62 to further distinguish relevant information. For example, with the question "What is the procedure to return my defective device?", the user profile might be used to understand the particular device the user is asking about. As described further in conjunction with FIG. 3, business process matcher and recommender 60 can match the intended business process of the question to candidate answers from one or more business process repositories 64, 66, with underlying evidence. In NLQA systems, "evidence" refers to snippets or fragments of a document in a knowledge base (corpus, or collection or corpora). Part of the cognitive processing is identifying one or more documents that contain the answer to the posed question. The document snippets that show the answer in context are referred to as evidence passages. It can be useful for users to be able to see the response in context because the additional information included in the evidence passage might provide greater insight into the subject that the person is asking about. Evidence can also refer (apart from the passage) to information including document title, document original file name, section title under which the passage was found, etc.

In this implementation business process repository 64 is on-premise, and business process repository 66 is in the cloud (i.e., a cloud computing network, including one implemented over the Internet). A particular business process might be located in more than one repository, and a given repository may actually consist of a collection of several process repositories, including cloud repositories, thereby providing the benefit of matching and recommending processes seamlessly across the cloud ecosystem.

Business process matcher and recommender 60 can filter (i.e., eliminate) certain candidate business processes and rank those remaining to determine a most likely match to the user's question, or several likely matches. In a preferred embodiment these recommended business practices are passed back to cognitive system core pipeline 58 which includes them in a response to user interface 52, along with a natural language answer, a confidence level, and the underlying evidence. User interface 52 may include appropriate graphical features to display information regarding the ranking of multiple business process answers. Any results or data from the response process can be stored to be used by the system later. Any or all of the components of NLQA system 50 can be implemented as part of computer system 10 of FIG. 1.

In a further embodiment, NLQA system 50 offers back to the end user (via user interface 52) a trigger to immediately start the right business process. Continuing with the example question "What is the procedure to return my defective device?", business process matcher and recommender 60 has determined that the most appropriate answer is a "Defective Device Returns & Handling" business process found in a retail transactions business process repository. Cognitive system core pipeline 58 offers this particular business process to the user to resolve the matter. The business process may further include automated steps that can be carried out in whole or in part with the assistance of NLQA system 50. If the user elects to invoke the "Defective Device Returns & Handling" business process, cognitive system core pipeline 58 can guide the user through various steps such as preparing and printing out an explanatory letter (and/or email), printing a shipping label, ordering any other necessary supplies online (such as a shipping box), and requesting postal service pickup.

Figure 3:
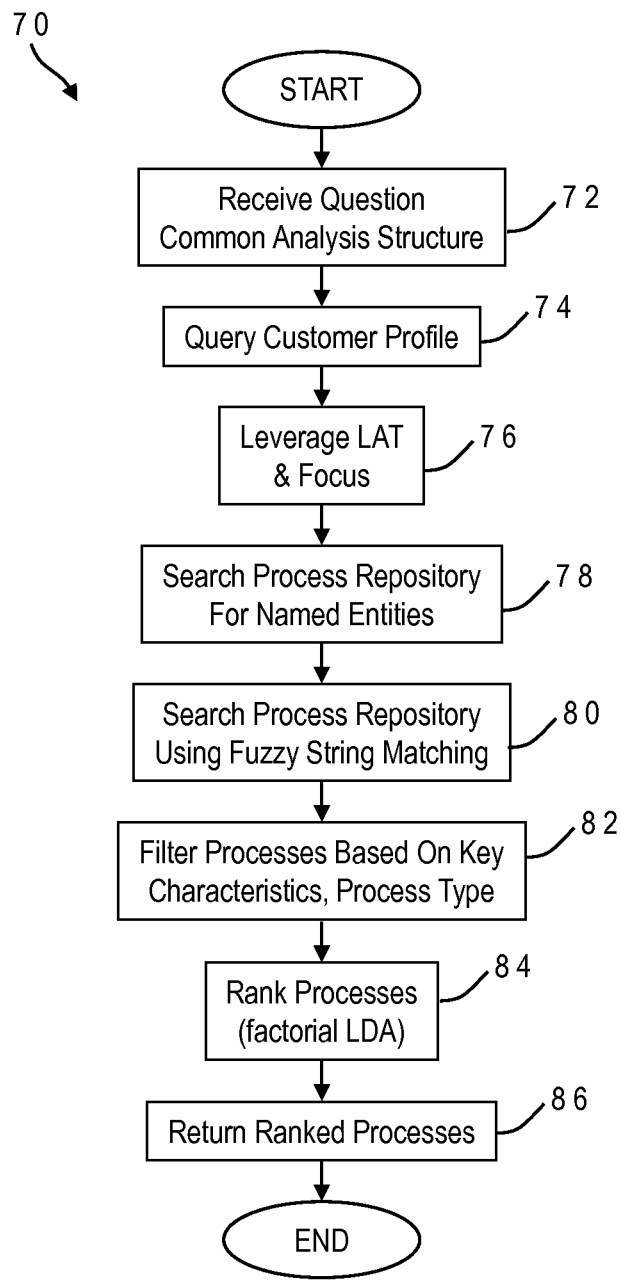
FIG. 3 is a chart illustrating the logical flow for a business process matcher and recommender in accordance with one implementation of the present invention.

The preferred operation of business process matcher and recommender 60 can be further understood with reference to the chart of FIG. 3 which illustrates the logical flow for one implementation of a matching and recommending process 70. Process 70 begins when the matcher and recommender receives the question CAS or other parsed data regarding the user question (72). The customer profile is then queried to extract various attributes that may be necessary or relevant to the question (74), such as residential versus enterprise customer, assured service level agreements (SLAs), location/city of the customer, etc. Customer attributes are useful when picking processes that have a particular SLA associated with them. For example, when a customer asks a question like "My shipment has not been delivered yet. How do I escalate the situation?", the customer profile might be such that he/she is a "Platinum" customer who has been promised next day delivery and requires resolution within 60 minutes. The customer profile attributes are also useful in ensuring selection of the right business process appropriate for the customer profile context.

Key characteristics of the question such as lexical answer type and focus are leveraged to provide a base for further searching (76). Other characteristics can be used, for example, question class. Business process repositories are searched for the leveraged characteristics both by named entity (78) and using fuzzy string matching (90). The searching can be accomplished using annotators that extract the concepts as expressed in a text fragment (question, answer or metadata) in a process repository. Potential business processes can be eliminated using filters, for example, against the key characteristics of the question (82). Any business process whose information (including metadata) does not include at least one key characteristic can be eliminated. The filter can also select only processes that are idempotent to avoid repeatedly issuing the same request to start a process. The remaining potential business processes are ranked according to their relevance to the question (84), and the ranked processes are returned to end process 70.

Various ranking methodologies may be used to provide confidence levels for the matching business processes. According to a further preferred implementation, candidate answers are analyzed based on a factorial latent Dirichlet allocation (LDA) algorithm. In natural language processing, LDA is a generative model that allows sets of observations to be understood by unobserved groups that explain why some parts of the data are similar. For example, if observations are words collected into documents, LDA posits that each document is a mixture of a small number of topics and that each word's creation is attributable to one of the document's topics. Without additional structure, LDA tends to learn distributions which correspond to semantic topics (such as "sports" or "economics") that dominate the choice of words in a document, rather than syntax, perspective, or other aspects of document content. In factorial LDA, a factorial structure is induced by creating priors which tie together tuples that share components.

The factorial LDA algorithm can be used to implement the ranking of the business processes by matcher/recommender 60. This approach essentially looks beyond the topic of the text and hence considers additional factors in the selection of the right business process. Not only are named entities extracted from the answers, but other latent factors can be extracted as well including topic of the evidence, a location where the document was published (e.g., country), topic meta-tags, author, date of publication, general resonance expressed by the answer (useful for finding in-domain versus out-of-domain), or sentiment or emotion expressed in the answer. Based on these k-different topical and latent factors, factorial LDA will match the optimum business processes (candidate answers) against the question analysis CAS.

The business process repositories can be manually curated or can be provided by a third party. Different characteristics can be assigned to the business processes. In a preferred implementation each business process in a repository is of one of three types, idempotent, non-binding or retrieve-only, based on the type of question requested and the type of answer to be provided. Idempotent processes are those which may be executed multiple times for the same data without changing the result. Non-binding processes are those which result is temporary changes that will not persist in client data. Retrieve-only processes are only used to get or prepare some data for use with or corresponding to the question/answer combination. In this manner a dynamic business process is in essence automatically embedding in a question and answering system based on how the system reacts.

The present invention accordingly provides an improved method of directly answering a natural language question and recommending the right set of business processes to invoke. This novelty not only provides much better end user experience, but also allows for operational efficiencies from both self-service and agent assisted scenarios. The result is quick and effective resolution of customer issues.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of responding to a natural language question from a user, comprising:
   receiving the natural language question in a computer-readable form, by executing first instructions in a computer system;
   analyzing the natural language question to find a plurality of key characteristics, by executing second instructions in the computer system;
   matching a plurality of business processes from at least one business process repository to the key characteristics, by executing third instructions in the computer system;
   ranking the plurality of matching business processes, by executing fourth instructions in the computer system; and
   recommending at least one particular business process from the plurality of matching business processes based on said ranking, by executing fifth instructions in the computer system, wherein said recommending includes displaying information regarding said ranking of the matching business processes on a display device of the computer system as part of a user interface.

2. The method of claim 1 wherein said analyzing includes named entity searching and fuzzy string matching of one or more of the key characteristics against the business process repository.

3. The method of claim 1 wherein said analyzing includes examining a user profile for the user to determine a user attribute that is relevant to the natural language question.

4. The method of claim 1 wherein the key characteristics at least include a focus term and a lexical answer type.

5. The method of claim 1 wherein each business process in the repository is designated as one of three process types including idempotent, non-binding or retrieve-only.

6. The method of claim 1 further comprising offering the user a trigger to invoke the particular business process.

7. The method of claim 1 wherein said matching includes performing a factorial LDA algorithm on both extracted named entities and latent factors from evidence against the key characteristics.

8. A computer system comprising:
   one or more processors which process program instructions;
   a memory device connected to said one or more processors; and
   program instructions residing in said memory device for responding to a natural language question from a user by receiving the natural language question in a computer-readable form, analyzing the natural language question to find a plurality of key characteristics, matching a plurality of business processes from at least one business process repository to the key characteristics, ranking the plurality of matching business processes, by executing third instructions in the computer system, and recommending at least one particular business process from the plurality of matching business processes based on said ranking, including displaying information regarding the ranking of the matching business processes on a display device of the computer system as part of a user interface.

9. The computer system of claim 8 wherein the analyzing includes named entity searching and fuzzy string matching of one or more of the key characteristics against the business process repository.

10. The computer system of claim 8 wherein the analyzing includes examining a user profile for the user to determine a user attribute that is relevant to the natural language question.

11. The computer system of claim 8 wherein the key characteristics at least include a focus term and a lexical answer type.

12. The computer system of claim 8 wherein each business process in the repository is designated as one of three process types including idempotent, non-binding or retrieve-only.

13. The computer system of claim 8 wherein said program instructions further include offering the user a trigger to invoke the particular business process.

14. The computer system of claim 8 wherein the matching includes performing a factorial LDA algorithm on both extracted named entities and latent factors from evidence against the key characteristics.

15. A computer program product comprising:
a computer readable storage medium; and
program instructions residing in said storage medium for responding to a natural language question from a user by receiving the natural language question in a computer-readable form, analyzing the natural language question to find a plurality of key characteristics, matching a plurality of business processes from at least one business process repository to the key characteristics, ranking the plurality of matching business processes, by executing third instructions in the computer system, and recommending at least one particular business process from the plurality of matching business processes based on said ranking, including displaying information regarding the ranking of the matching business processes on a display device of the computer system as part of a user interface.

16. The computer program product of claim 15 wherein the analyzing includes named entity searching and fuzzy string matching of one or more of the key characteristics against the business process repository.

17. The computer program product of claim 15 wherein the analyzing includes examining a user profile for the user to determine a user attribute that is relevant to the natural language question.

18. The computer program product of claim 15 wherein the key characteristics at least include a focus term and a lexical answer type.

19. The computer program product of claim 15 wherein each business process in the repository is designated as one of three process types including idempotent, non-binding or retrieve-only.

20. The computer program product of claim 15 wherein said program instructions further include offering the user a trigger to invoke the particular business process.

21. The computer program product of claim 15 wherein the matching includes performing a factorial LDA algorithm on both extracted named entities and latent factors from evidence against the key characteristics.

* * * * *